United States Patent [19]

O'Brian

[11] Patent Number: 5,292,169
[45] Date of Patent: Mar. 8, 1994

[54] TRUCK CONTAINER COVER

[76] Inventor: Woody V. O'Brian, 3301 Teal Dr., Wilson, N.C. 27893

[21] Appl. No.: 26,450

[22] Filed: Mar. 4, 1993

[51] Int. Cl.⁵ ............................................. B60P 7/02
[52] U.S. Cl. ...................................... 296/98; 160/67; 160/70
[58] Field of Search ............... 296/98; 242/86.5 R, 242/86.52; 160/67, 68, 70, 72, 243

[56] References Cited

U.S. PATENT DOCUMENTS

| | | | |
|---|---|---|---|
| 3,549,197 | 12/1970 | Sibley | 296/100 |
| 3,549,198 | 12/1970 | Cappello | 296/100 |
| 3,549,199 | 12/1970 | Sibley | 296/100 |
| 3,833,255 | 9/1974 | Logue | 296/101 |
| 3,868,142 | 2/1975 | Bachand et al. | 296/98 |
| 4,050,734 | 9/1977 | Richard | 296/98 |
| 4,082,347 | 4/1978 | Petretti | 296/100 |
| 4,157,202 | 6/1979 | Bachand | 296/100 |
| 4,225,175 | 9/1980 | Fredin | 296/98 |
| 4,341,416 | 7/1982 | Richard | 296/98 |
| 4,673,208 | 6/1987 | Tsukamoto | 296/98 |
| 4,874,196 | 10/1989 | Goldstein et al. | 296/98 |
| 4,981,317 | 1/1991 | Acosta | 296/98 |

FOREIGN PATENT DOCUMENTS

| | | | |
|---|---|---|---|
| 2027827 | 4/1991 | Canada | 296/98 |
| 7703999 | 10/1978 | Netherlands | 160/67 |

Primary Examiner—Dennis H. Pedder
Attorney, Agent, or Firm—Richard H. Childress; David A. Harlow

[57] ABSTRACT

An improved truck container cover apparatus for covering the open top of a container positioned on a truck for transportation which includes a pair of hydraulically actuated arms which are positioned with the container therebetween. The arms carrying a covering means including a container cover and are provided with a pivotal linkage as well as a pivotal base so that the container cover can be extended or retracted over containers of various sizes.

7 Claims, 4 Drawing Sheets

TRUCK CONTAINER COVER

BACKGROUND OF THE INVENTION

This invention relates generally to an apparatus for attachment to the bed or frame of a truck for extending and retracting a flexible cover sheet over a container positioned on the truck bed in order that the contents of the container will not spill out or blow away during transport of the truck hauling the container. More specifically, this invention relates to an apparatus for extending and retracting a flexible cover sheet over open containers of various sizes which may at different times be positioned for hauling garbage and the like on the truck bed.

As is well understood in this art, it is advantageous for the truck and its bed or frame to be capable of hauling various size containers for transporting garbage and the like. These containers can often range in size from about 20 cubic yards to about 40 cubic yards, that is from about 21 feet long × 3¾ feet high to about 22 feet long × 7¾ feet high, respectively. Therefore, it would be an advantage to have an apparatus which could be capable of covering such various size containers with a container cover. Also, it is often advantageous in either extending or retracting the container cover over the container to maintain as low a clearance as possible in order to minimize or prevent damage to the cover in the case of winds or other objects exerting high forces on the cover during its covering motion.

Within the prior art, U.S. Pat. No. 4,981,317 discloses an apparatus wherein the spool is mounted for vertical movement so that containers having different heights may be properly closed. There is no disclosure within this patent of the capability of closing containers of different lengths or closing the containers with minimal clearance of the cover sheet as it moves across the container. U.S. Pat. No. 3,868,142 discloses an apparatus provided with support means, with vertical and horizontal, which are capable of covering a container of various heights and lengths. There is no disclosure within the patent of closing the containers with minimal clearance of the cover sheet as it moves across the container. U.S. Pat. No. 4,874,196 discloses an apparatus provided with telescopic arms which are capable of carrying a cover sheet across the container in a low trajectory resulting in minimal clearance of the container. There is no disclosure within the patent of closing containers of various sizes, that is, various heights and various lengths.

Therefore, it would represent an advancement in the art to provide an apparatus for attachment to the bed of a truck for moving a cover sheet over an open container positioned thereon with the apparatus capable of covering containers of various size heights or lengths and with, if desired, minimal clearance over the container; especially if such an apparatus has few structural members required for operation and is provided with structural members capable of achieving maximum flexibility of operation.

SUMMARY OF THE INVENTION

This invention provides an improved apparatus for use on a truck bed on which can be positioned containers of various sizes. The apparatus attaches to the truck bed and operates to extend and retract a flexible cover sheet over the container. One aspect of the apparatus provides for a cover means which includes a flexible cover sheet of a size to cover the container and a roller means on which the flexible cover can be rolled. A vertical support means, mounted on the truck bed, supports the cover means. A pair of arm members are each positioned along the side of the truck bed with the container positioned between the arm members. Each of the arm members is provided with a base portion and an extension portion connected by a pivotal connection between the two portions. The end of the extension portion of each arm member is connected to the cover means. The end of the base portion of each arm member is provided with a pivotal aperture. Supporting the arm member and providing a mount for the pivotal aperture is a horizontal support means mounted on the truck bed. Mounted across the pivotal base and connected to the horizontal support means and the base portion of the arm member is a first activating means. Mounted across the pivotal connection and connected to the base portion and the extension portion of the arm member is a second activating means. The first and second activating means can each be selectively activated in order to control the movement of the arm members in carrying the cover means to extend or retract the cover sheet over an open container of a pre-determined size.

These and other objects, advantages and features of this invention will appear hereinafter, and for purposes of illustration, but not limitation, an exemplary embodiment of the invention is shown in the appended drawings.

DETAILED DESCRIPTION AND THE PREFERRED EMBODIMENT

Figure 1:
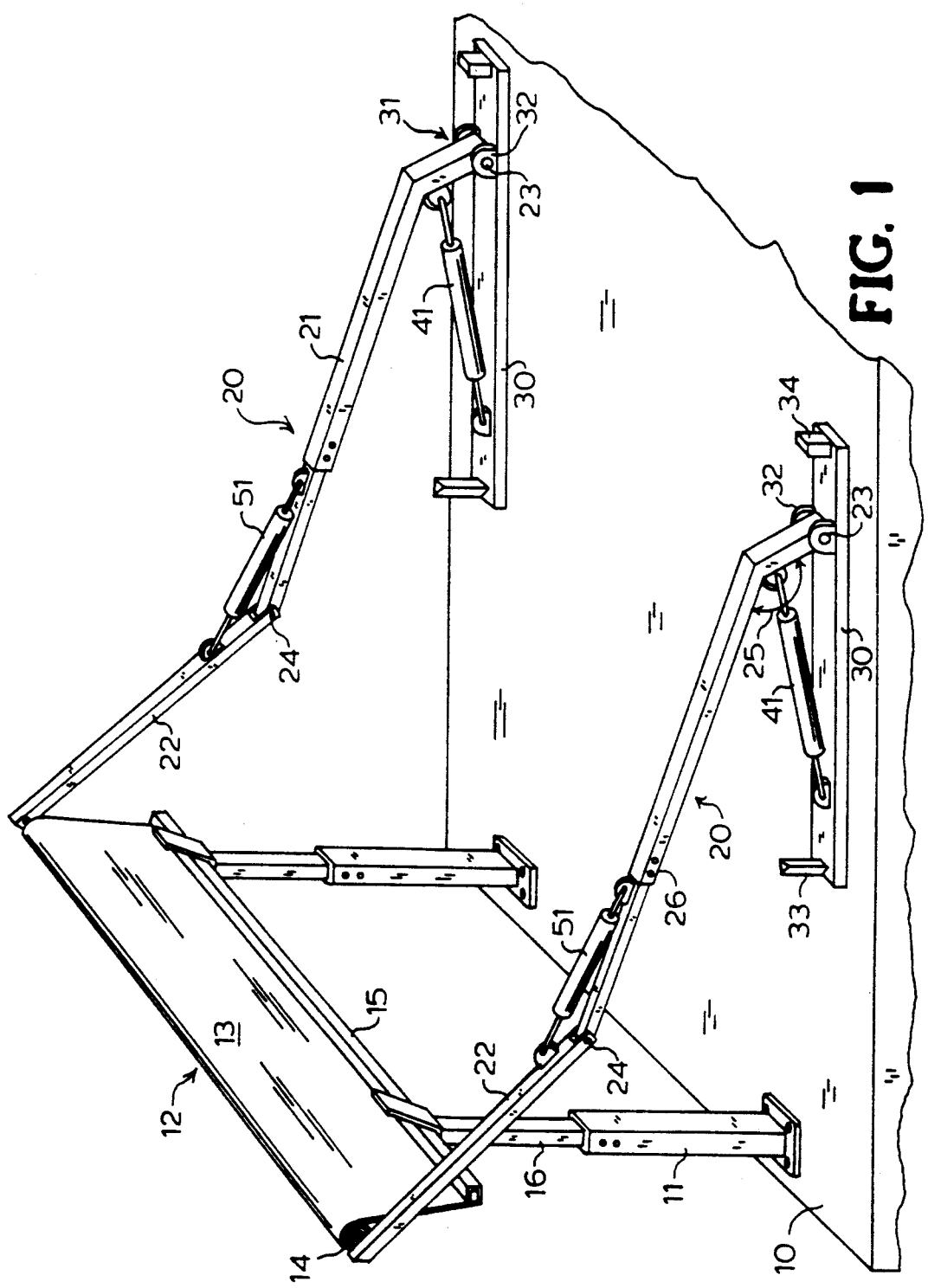
FIG. 1 is a perspective view of a portion of a truck bed with the apparatus of this invention shown with the cover sheet in a slightly extended position.
Figure 2:
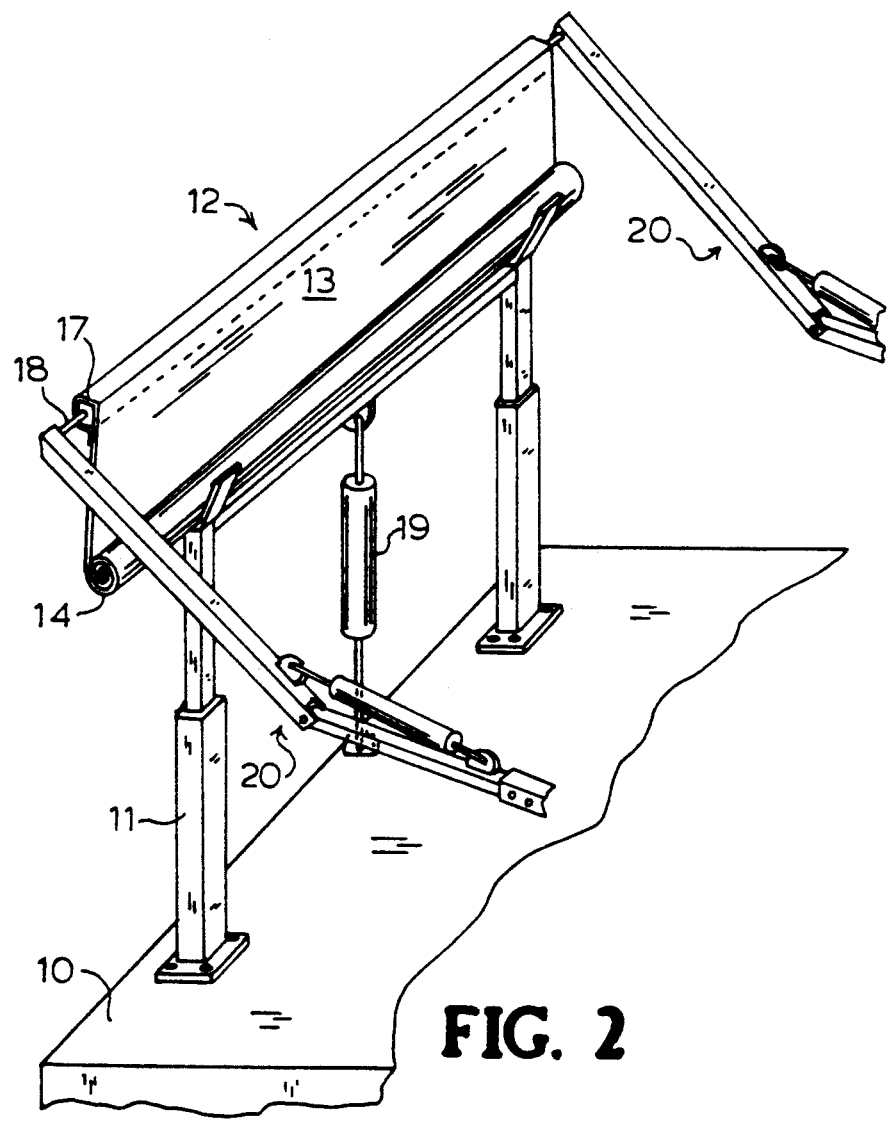
FIG. 2 is a perspective view of a portion of a truck bed and a portion of the apparatus of this invention shown with a different embodiment than FIG. 1 with respect to the cover means.

Referring to FIGS. 1 and 2, a bed of a truck 10 has a pair of vertical support means 11, such as a pair of upright standards, with each mounted at its base to the truck bed. The upright standards 11 can be provided with a section 16 which can telescope within the upright standard member and can be raised or lowered by activation of hydraulic cylinder 19 in order to permit a slight adjustment and better position for the upright standards. The upright standards 11 are preferably of a height which is slightly less than the height of the least height dimensional container in order to ensure that the cover sheet adequately covers the front or leading edge of the container. The standards support a cover means 12 which includes a flexible cover sheet 13, such as a tarpaulin, which is rolled onto a roller means 14, such as a spool. The cover sheet is of sufficient size to cover the open container, not shown. The cover when extended over the open container retains loose articles in the container, particularly when under motion. In one embodiment, FIG. 2, the upright standards support a spool 14 from which is rolled the cover sheet 13. The spool can be provided with a housing which is also mounted on the vertical standards. In another embodiment, FIG. 1, the upright standards support a cross member 15 to which is attached the leading or free transverse edge of the cover sheet. The spool with the cover sheet rolled thereon can then be rotated or unrolled as it is moved over the open container. Again, the cross support member can be provided with a housing for receiving the spool with the cover sheet rolled thereon in its retracted position.

In FIG. 1, a pair of arm members, such as arms 20, are each formed of two portions, a base portion 21 and an extension portion 22. The base portion is provided with a pivotal aperture 23. The base portion 21 has a bent or "dog leg" shape, generally with an angle 25 between the bent sections of between about 120° and 160°. The extension portion 22 of the arm member is generally straight and is connected to the base portion with a pivotal bolt connection 24. The other end of the extension portion is connected to the cover means 12. As shown, the base portion can be provided with a section 26 which can telescope within the base portion member and retained therein by a key inserted into predetermined spaced holes in order to permit a slight adjustment and better fit for the arm member. In one embodiment, FIG. 2, the leading or free transverse edge of the cover sheet 13 is sleeved at 17 and a rod 18 is put into the sleeve and anchored to the arms 20 so that when the arms move they will carry the cover sheet 13 which unrolls across the open container from the spool as the spool rotates. In another embodiment, FIG. 1, the arms 20 are each connected to the spool 14 so that when the arms move they will carry the spool which as it rotates unrolls the cover sheet 13 across the open container.

A pair of horizontal support means 30, such as a pair of plate members, are mounted on the truck bed and support the arms. The support is provided by a pivotal connection 31 formed by the pivotal aperture 23 of the end of the base portion fitting within a pair of supports bases 32 on the plate members. This attachment provides an ability of the arm 20 to pivot at the base portion about the plate members 30. In addition, the plate can be provided with rest supports 33 and 34 which support the arms in their fully retracted and fully extended position.

A pair of first activating means 41, such as a pair of first hydraulic powered cylinders are mounted to the plate members 30 and to the base portion 31 of the arms across the pivotal base. The activation of the hydraulic cylinders will move, the arms from a forward or rest position to an aft or rearward rest position which is generally on the aft edge of the open container.

A pair of second activating means 51, such as a pair of second hydraulic powered cylinders, are mounted to the base portion 21 as well as the extension portion 22 of each arm. The hydraulic cylinders span across the pivotal connections 24 between the base portion and extension portion. The activation of the hydraulic cylinders will move the extension portion of each arm relative to the base portion of the arm. In this manner, the arm may be bent or positioned from its initial bent position, as shown, to its fully extended position.

The complete hydraulic system, not shown, contemplated for use as the activating means herein is of a standard or conventional type comprising a tank for holding hydraulic fluid which is used by a motor driven pump to pump the fluid to the hydraulic cylinders which extend or retract the piston rods therein to move the arms at their pivot linkages. The motors for driving the hydraulic pumps are easily controllable from a simple area in the truck cab or on the side or bed of the truck. The fluid lines can be directed to individual hydraulic cylinders for activation individually or combined in any manner to activate the hydraulic cylinders in unison or in tandem, if desired.

Figure 3:
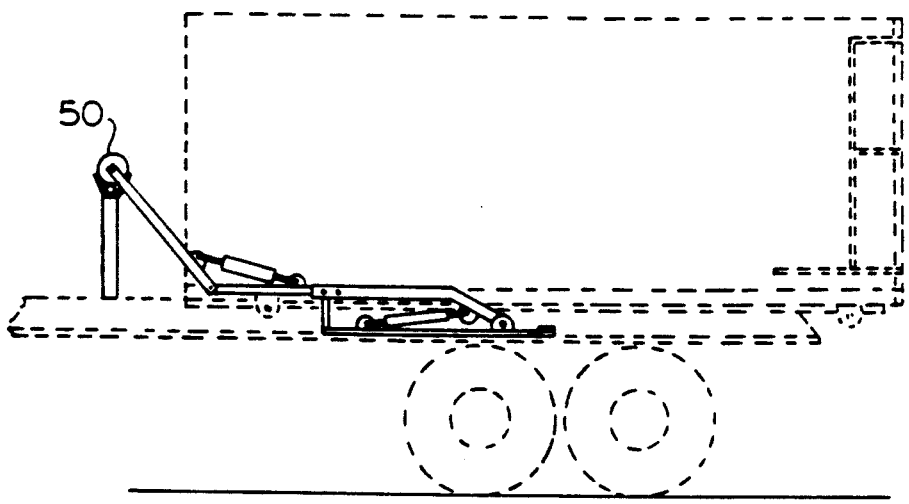
FIGS. 3-5 are side elevational views of a portion of a truck bed, a container, in dotted lines, of a relatively large size, i.e., height and length, and the apparatus of this invention shown at different positions of operation.
Figure 4:
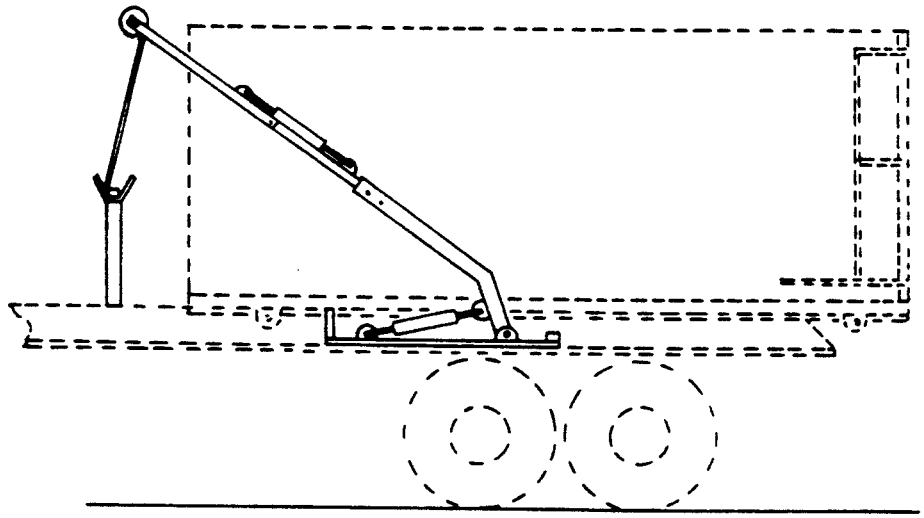
Figure 5:
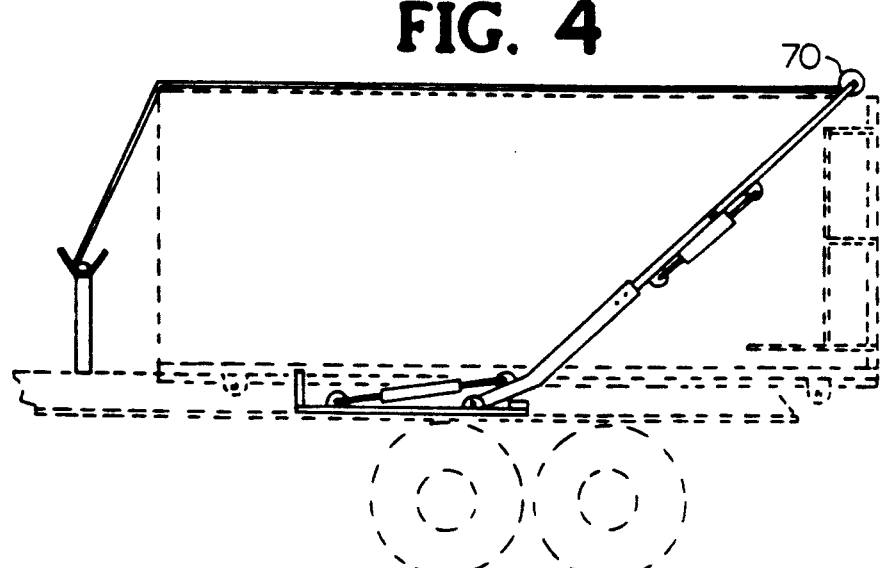
Figure 6:
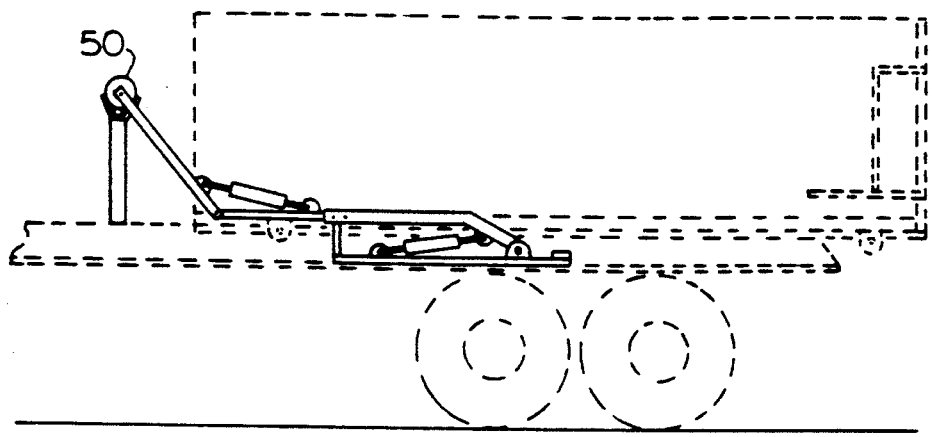
FIGS. 6-8 are side elevational views of a portion of a truck bed, a container, in dotted lines, of a relatively small size, i.e., height and length, and the apparatus of this invention shown at different positions of operation.
Figure 7:
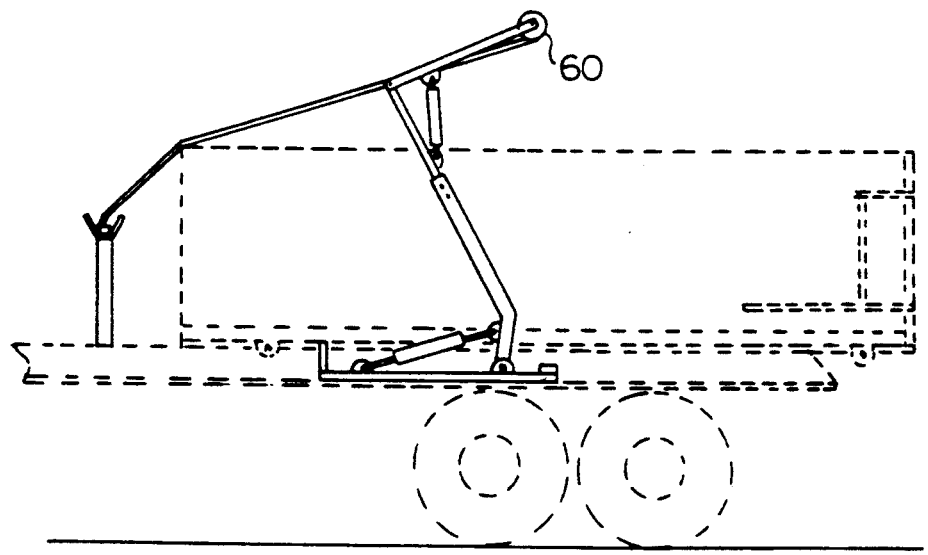
Figure 8:
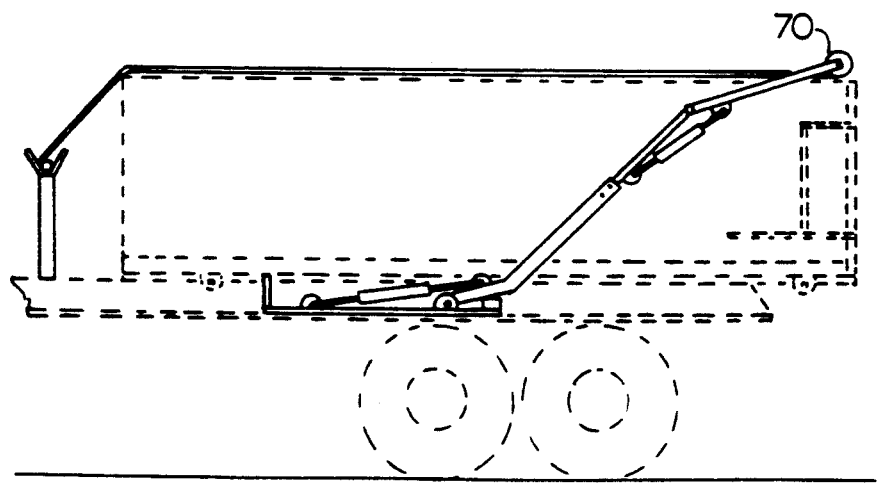

Referring to FIGS. 3–8, the operation of the apparatus is shown. FIGS. 3–5 shown the apparatus and its movements carrying a cover sheet over a large size container. FIGS. 6–8 show the apparatus and its movements carrying a cover sheet over a smaller sized container. In operation, the container is positioned on the truck bed between the arms. The arms and cover means are in the retracted position 50, as shown. After the container is loaded and before transport begins, the first and second activating means are selectively activated in such a manner that the arms which carry the cover means are brought rearward or aft and the cover means unrolls or extends the cover sheet over the container. As is shown, the arm can be flexed or bent in movement 60 so that the cover sheet can be extended along the open container at minimal clearance over the container. At its fully extended position 70, the cover sheet fully covers the open container. The uncovering of the container or retraction of the cover sheet is, in general, the reverse of the covering operation.

It should be noted that various modifications, changes, and variations may be made in the arrangement, operation and details of construction of the structures disclosed herein without departing from the spirit and scope of this invention.

What is claimed is:

1. For use on a truck bed on which can be positioned a container of various sizes, an apparatus for attachment to the truck bed for extending and retracting flexible cover sheet over said container, said apparatus comprising:

a cover means including a flexible cover sheet having a size sufficient to cover the container and a roller means on which said flexible cover sheet may be rolled;

a vertical support means mounted on the truck bed for supporting said cover means;

a pair of arm members, each positioned on the side of the truck bed with the container therebetween, said arm member comprised of a base portion and an extension portion connected by a pivotal connection therebetween;

said arm member connected on the end of the extension portion to said cover means and the end of the base portion provided with a pivotal aperture;

a horizontal support means mounted on the truck bed for supporting said arm member and providing a mount for the pivotal aperture;

first activating means mounted to said horizontal support means and said base portion of the arm member with the pivotal aperture mount spanned therebetween;

second activating means mounted to the base portion and the extension portion of said arm member and spanning the pivotal connection therebetween;

whereby said first and second activating means are capable of being selectively activated in order to control the movement of said arm member in extending or retracting said cover sheet over a predetermined various sized open container.

2. An apparatus according to claim 1, wherein said activating means are hydraulic means.

3. An apparatus according to claim 2, wherein the angle formed between the bent sections of said base portion is about 120° to about 160°.

4. An apparatus according to claim 2, wherein said vertical support means has a telescopic section for slight adjustments to its height.

5. An apparatus according to claim 2, wherein said horizontal support means has a pair of rest supports for supporting said arm member in its fully retracted and fully extended positions.

6. An apparatus according to claim 2, wherein said arm members are connected to the roller means of said cover means and carry said roller means in their movement.

7. An apparatus according to claim 2, wherein said arm members are connected to a free end of the cover sheet of said cover means and carry said free end of the cover sheet in their movement.

* * * * *